United States Patent [19]
Gilibert

[11] Patent Number: 4,951,497
[45] Date of Patent: Aug. 28, 1990

[54] PROCESS AND APPARATUS FOR MEASURING THE ROUGHNESS OF THE SURFACE OF A PIECE

[75] Inventor: Yvon Gilibert, Reims, France

[73] Assignee: A.R.M.I.N.E.S., Paris, France

[21] Appl. No.: 298,183

[22] Filed: Jan. 17, 1989

[30] Foreign Application Priority Data

Jan. 22, 1988 [FR] France .................. 88 00708

[51] Int. Cl.⁵ .............................................. G01B 5/28
[52] U.S. Cl. ..................................................... 73/105
[58] Field of Search .................. 73/105, 104; 33/787, 33/790

[56] References Cited

U.S. PATENT DOCUMENTS

| | | | |
|---|---|---|---|
| 3,777,558 | 12/1973 | Bain | 73/105 |
| 3,800,598 | 4/1974 | Michel | 73/104 |
| 4,198,362 | 4/1980 | Ticker et al. | 73/105 X |

FOREIGN PATENT DOCUMENTS

| | | | |
|---|---|---|---|
| 1583511 | 11/1969 | France | |
| 137005 | 6/1986 | Japan | 73/105 |
| 431440 | 6/1975 | U.S.S.R. | 73/104 |
| 1232929 | 5/1986 | U.S.S.R. | 73/105 |

Primary Examiner—Hezron E. Williams
Assistant Examiner—Joseph W. Roskos
Attorney, Agent, or Firm—McAulay Fisher Nissen & Goldberg

[57] ABSTRACT

This invention relates to a process for measuring the roughness of a surface of a piece in which there is applied on the rough surface of the piece a first surface of a deformable flat element and there is exerted on a second surface of the deformable flat element, parallel and opposite the first surface, a constant pressure in the direction of the piece, so that the first surface of the deformable element closely follows the profile of the rough surface, penetrating between the peaks of this rough surface, wherein the deformable flat element is made of a material having a high degree of reversible elastic deformability so that the first surface of the element penetrates elastically and reversibly between the peaks of the rough surface, and the deformation (Poisson's contraction or dilatation) or the resultant displacement of the second surface of the deformable element is measured in situ, i.e. while the deformable flat element is being pressed against the rough surface. The invention also relates to an apparatus for carrying out this process.

20 Claims, 4 Drawing Sheets

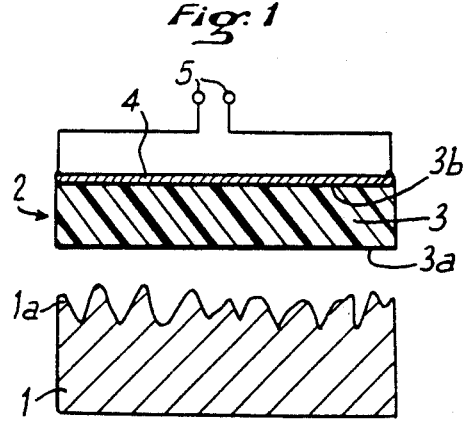
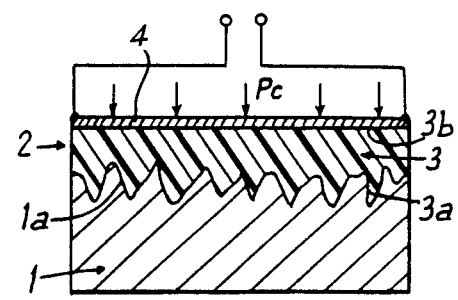
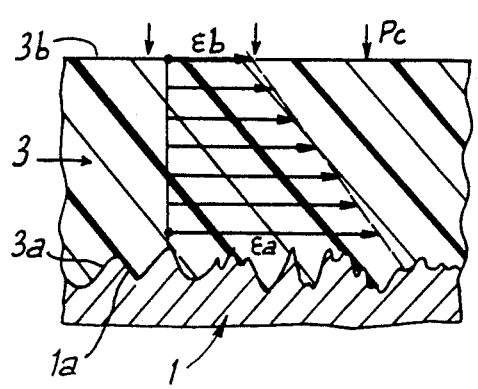
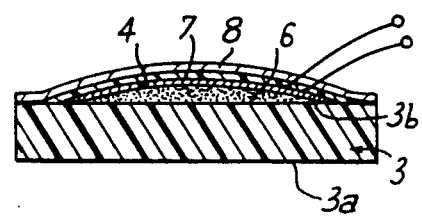
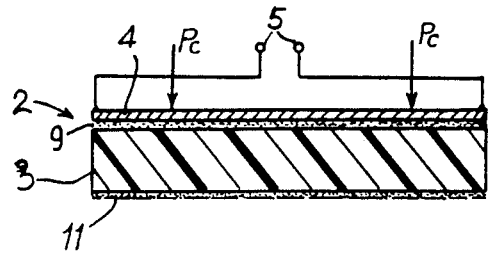
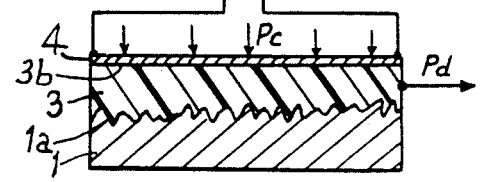

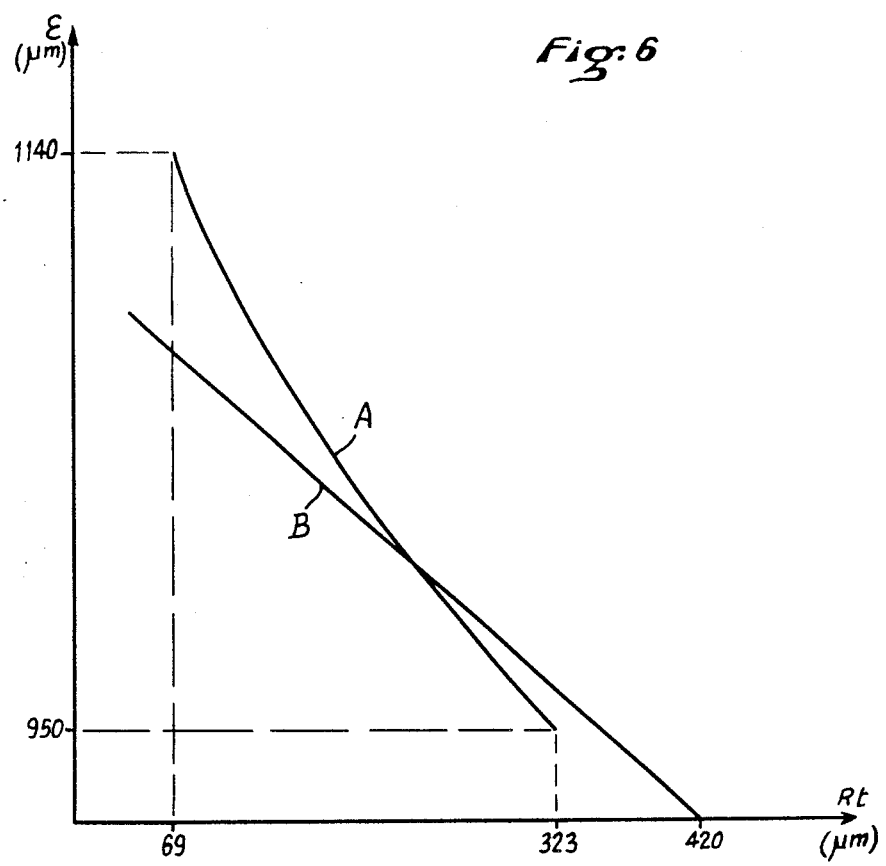
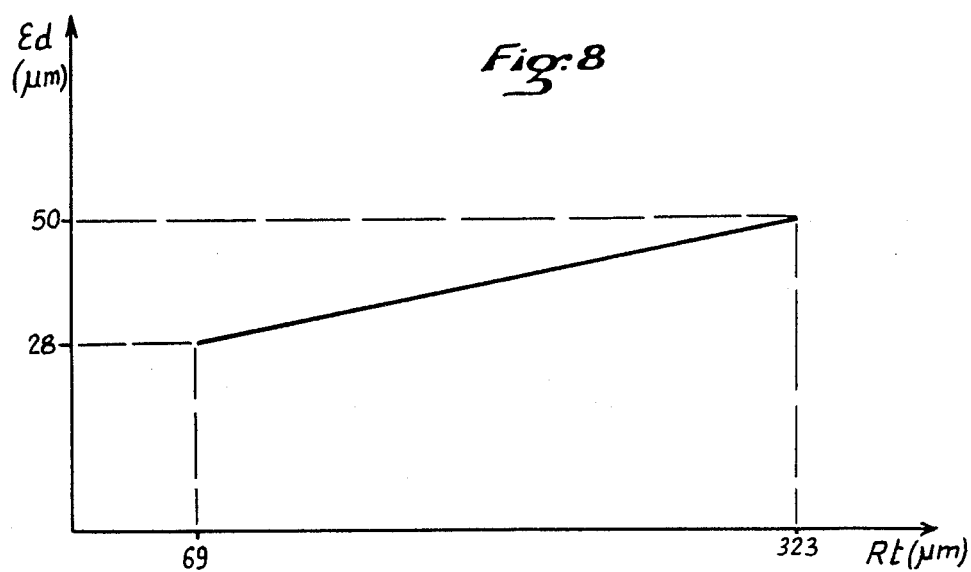

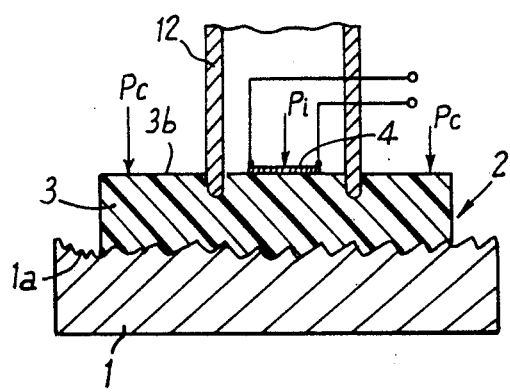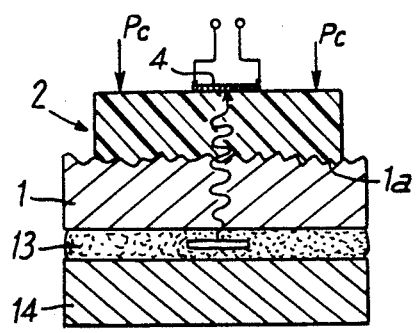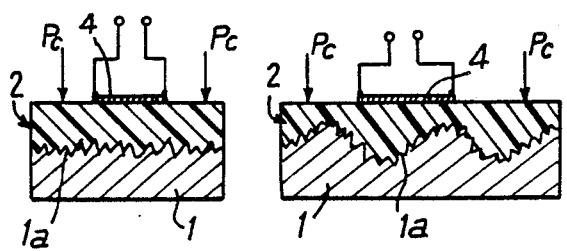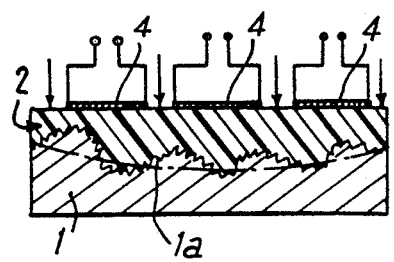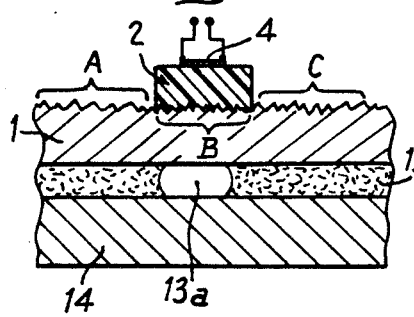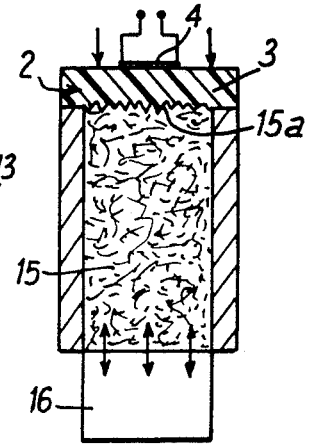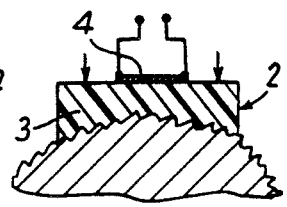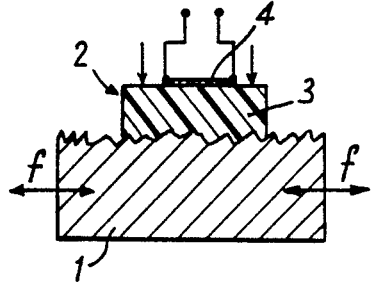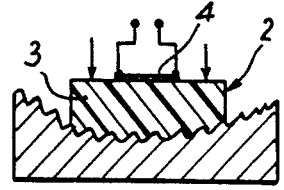

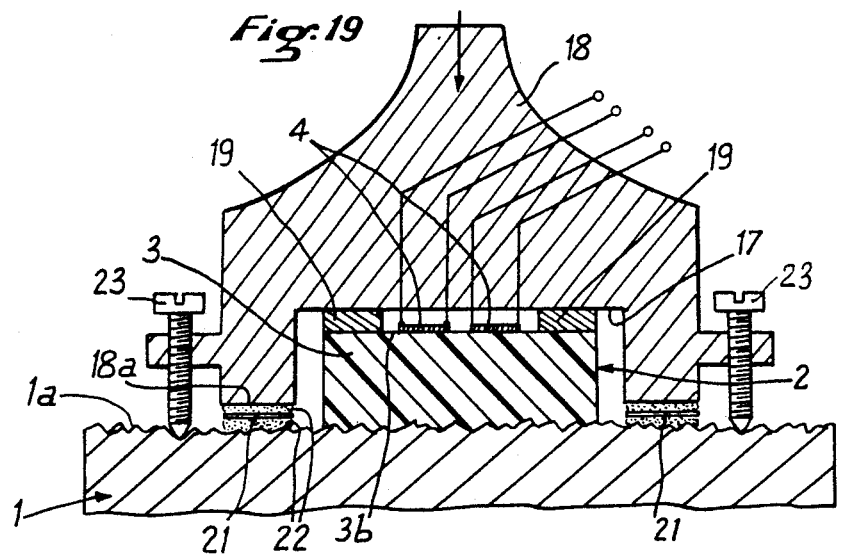
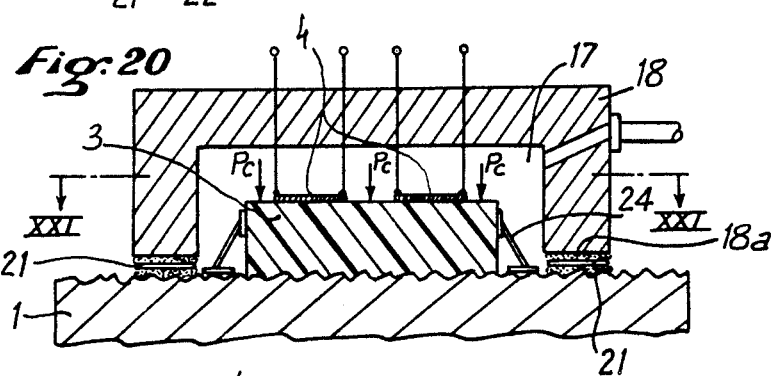
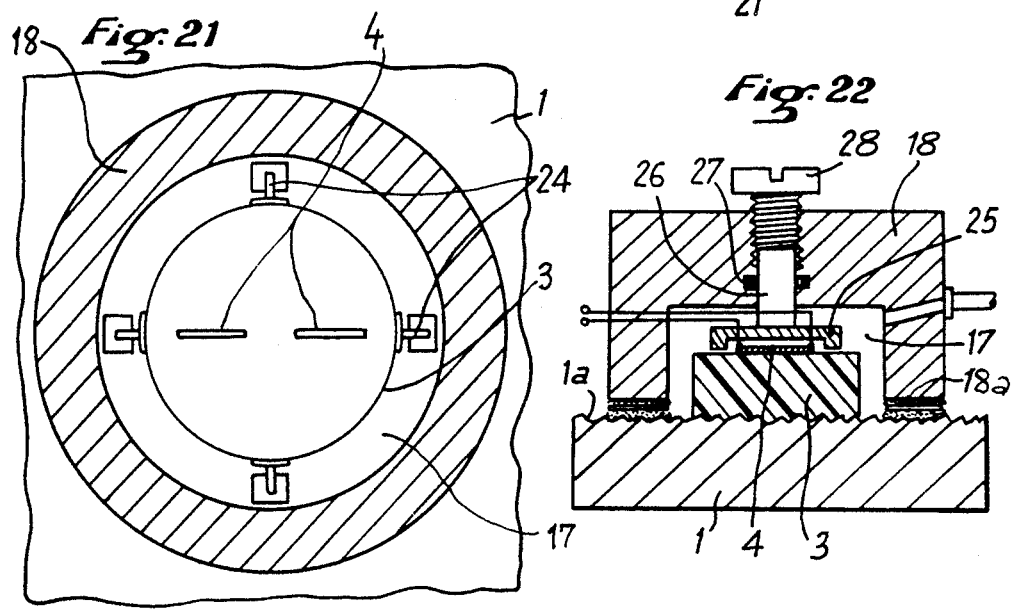

PROCESS AND APPARATUS FOR MEASURING THE ROUGHNESS OF THE SURFACE OF A PIECE

FIELD OF THE INVENTION

The present invention relates to a process and apparatus for measuring the roughness of the surface of a piece.

BACKGROUND OF THE INVENTION

In numerous industrial domains, the determination of the surface state or of the roughness of a piece, particularly made of metal, is of the highest importance. In fact, the roughness determines a large number of functions, in particular the conditions of friction between two pieces, their adherence, their surface energy, the adherence of an intermediate layer of glue serving to assemble two pieces, etc... It is therefore necessary, in these industrial applications, to determine with precision the roughness of the surface of the pieces in question. Such determination has up to the present time been effected by means of so-called "roughness-measuring" apparatus, which are generally of particularly complex structure and delicate to employ, or optical or interferometric, etc . . . methods.

As described in Patent FR-A-1 583 511, a device is known for recording the surface state of a piece which is constituted by a composite film comprising a thin layer of supple synthetic material, capable of undergoing temporary plastic deformations, superposed on a thin layer of malleable material capable of undergoing permanent plastic deformations, with the interposition between these two materials of a bonding product such as an adhesive. This composite film, once applied under pressure against a surface whose roughness must be characterized, enables a three-dimensional impression of this rough surface to be instantaneously made on the malleable material. Although such a device makes it possible easily to note the surface state of a piece, it does not allow an automatic and instantaneous interpretation of the deformation of the layer of malleable material characterizing the roughness of the surface.

It is an object of the present invention to overcome these drawbacks by providing a process and an apparatus of very simple design enabling precise, reliable measurements of the roughness to be very rapidly obtained.

SUMMARY OF THE INVENTION

To that end, this process for measuring the roughness of a surface of a piece in which there is applied on the rough surface of the piece a first surface of a deformable flat element and there is exerted on a second surface of the deformable flat element, parallel and opposite the first surface, a constant pressure in the direction of the piece, so that the first surface of the deformable element closely follows the profile of the rough surface by penetrating between the peaks of this rough surface, is characterized in that the deformable flat element is made of a material having a high degree of reversible elastic deformability so that the first surface of the element penetrates elastically and reversibly between the peaks of the rough surface, and the deformation (Poisson's contraction or dilatation) or the resultant displacement of the second surface of the deformable element is measured in situ, i.e. whilst the deformable flat element is being pressed against the rough surface.

According to a further feature of the invention, an effort of variable intensity may further be exerted on the deformable element, during measurement, parallel to the plane of the rough surface.

The invention also relates to an apparatus for measuring the roughness of a surface of a piece comprising a volumic roughness sensor constituted by a deformable pal surfaces, namely a first surface adapted to be applied on the rough surface whose roughness is to be measured, and a second surface and means for applying the deformable element under pressure on the rough surface, characterized in that the deformable element is made of a material having a high degree of reversible elastic deformability and it bears on its second surface, i.e. the one which is opposite the first surface applied on the rough surface, at least one deformation gauge connected to a measuring apparatus.

The process and apparatus according to the invention make it possible to obtain, by a simple measurement of extensometry, an indication of the roughness of the surface of the piece from the measuring signal furnished by the deformation gauge.

The apparatus according to the invention constitutes a volumic or three-dimensional roughness sensor which is completely recoverable after each measurement of roughness.

BRIEF DESCRIPTION OF THE DRAWINGS

The invention will be more readily understood on reading the following description with reference to the accompanying drawings, in which:

FIG. 1 is a view in section of a piece with rough surface whose roughness is to be measured and of a measuring apparatus according to the invention, the piece and the apparatus being spaced apart from each other.

FIG. 2 is a view in section similar to that of FIG. 1 during an operation of measurement of roughness.

FIG. 3 is a view in section illustrating the distribution of the deformations in the thickness of the deformable element during a measurement of roughness.

FIG. 4 is a view in section of an embodiment of a volumic roughness sensor according to the invention.

FIG. 5 is a view in section of a variant embodiment of a volumic roughness sensor according to the invention.

FIG. 6 is a diagram illustrating the variation of superficial deformation measured as a function of the roughness of the surface of the piece.

FIG. 7 is a view in section illustrating a variant embodiment of the process of measurement according to the invention.

FIG. 8 is a diagram illustrating the variation of the superficial deformation at the start as a function of the roughness of the surface of the piece.

FIGS. 9 to 18 are schematic views in section illustrating various applications of the roughness sensor according to the invention.

FIG. 19 is a view in section of a practical embodiment of an apparatus according to the invention for measuring roughness.

FIG. 20 is a view in section of a variant embodiment of the measuring apparatus shown in FIG. 19.

FIG. 21 is, a view in horizontal section made along line XXI—XXI of FIG. 20.

FIG. 22 is a view in section of another variant embodiment of the measuring apparatus shown in FIG. 19.

DETAILED DESCRIPTION OF THE DRAWINGS

Referring now to the drawings, FIGS. 1 and 2 show a piece 1, for example made of metal, which presents a rough surface 1a whose roughness is to be measured. This roughness is constituted by microscopic peaks and valleys resulting from the elaboration of the surface 1a which must perform a definite function, and the geometric form of these peaks and valleys, i.e. the pitch between the peaks and the depth of the valleys between the peaks, varies with the means of elaboration, the parameters of application of a given elaboration and the nature of the substrates treated. In order to measure the roughness of the surface 1a of the piece 1, a volumic roughness sensor is used, according to the invention, designated as a whole by reference 2 in FIGS. 1 and 2. This sensor is essentially constituted by a deformable element 3 made of a material having a certain degree of flexibility, i.e. a high reversible elastic deformability, for example rubber of the "ZODIAC" or "HUTCHINSON" type, this deformable element 3 having a constant thickness of 0.4 mm for example. The deformable element 3 presents a first flat surface 3a, smooth or slightly rough, adapted to be applied against the rough surface 1a of the piece 1. The deformable element 3 bears, on its second flat surface 3b, parallel to and opposite the first surface 3a, an extensometry gauge 4 of which the two ends are connected to terminals 5 adapted to be connected to a measuring apparatus.

In order to measure the roughness of the surface 1a of the piece 1, there is applied on this surface the volumic roughness sensor 2, under a predetermined constant pressure Pc, which is applied on the second surface 3b of the deformable element 3 and which is transmitted to the first surface 3a through the material of element 3. As shown in FIGS. 2 and 3, this results in the first surface 3a being deformed, under the effect of the pressure Pc, following the profile of the rough surface 1a, the material of the deformable element 3 penetrating elastically and reversibly in the valleys defined between the peaks of the rough surface 1a. The penetration of the deformable element 3 in the peaks, under the effect of the pressure Pc, provokes a mean elongation in the direction perpendicular to the rough surface 1a and a contraction $\epsilon a$ in the rough mean plane due to the Poisson effect. The deformation of compression $\epsilon a$ of the material of the element 3, which is produced in the plane of the deformed contact surface 2a, further to the penetration of the material in the valleys of the rough surface 1a, is transmitted, whilst progressively decreasing, through the thickness of the element 3 and it is translated by a deformation of lesser compression $\epsilon b$, in the plane of the second surface 3b of the element 3, as illustrated schematically in FIG. 3. This superficial compression deformation $\epsilon b$ is measured by the extensometry gauge 4 and it characterizes the roughness of the surface 1a.

Due to the elastic and reversible behaviour of the material constituting the deformable element 3, the whole of its volume and in particular of the rough surface 3a conserves its integrity, i.e. it resumes its natural shape at rest after each roughness-measuring operation. The superficial deformation $\epsilon b$, in the plane of the second surface 3b, thus depends on the roughness of the surface 1a, for the same constant pressure Pc and it is therefore possible to measure the roughness of any surface 1a of a piece 1 from the measurement of the superficial deformation $\epsilon b$ furnished by the extensometry gauge 4. It suffices to calibrate the volumic roughness sensor 2 from existing roughness standards.

In order to produce the pressure Pc applied to the deformable element 3, various means may be used, such as pneumatic, mechanical, electro-magnetic, etc . . . devices. In particular, a piston may be used, housed in a body and defining with this body, on one side, a chamber in which is introduced a fluid under variable pressure such as air or any gas, so as to apply the other side of the piston, with a variable pressure, on the roughness sensor itself applied against the piece 1. According to a variant, the piston may be eliminated and the pressure Pc of any fluid may be directly applied on the second surface 3b of the deformable element 3. This allows this element 3 to be adapted to pieces 1 having rough surfaces 1a of any shapes close to the plane. To create the pressure Pc, an electro-magnet with variable field may also be used, whose mobile armature is applied against the roughness sensor.

In the embodiment of the invention shown in FIG. 4, the extensometry gauge 4, which may for example be a gauge of the HBM type (k=2.11), is glued on the second surface 3b of the deformable element 3 by means of a layer of glue 6 (for example a Z80 HBM glue). Above the extensometry gauge 4 extends a protective layer of resin 7 and above this layer is disposed a piece of adhesive tape 8.

In the variant embodiment of the invention shown in FIG. 5, the volumic roughness sensor comprises an extensometry gauge 4 which is fixed to the second surface 3b of the deformable element 3 by means of a doubleface self-sticking adhesive 9. Another self-sticking adhesive 11 is applied on the first surface 3a, to ensure bond of the deformable element 3 with the piece 1 whose surface roughness is to be measured. When the sensor 2, as shown in FIG. 5, adheres to the piece 1 with rough surface 1a, the adherence depends on the roughness of the surface 1a and on the nature of the prestressed superficial layer in which is formed the rough surface 1a, i.e. in fact on the atom distribution mesh in this layer and on the free surface energy.

Other means may, of course, be envisaged for holding the roughness sensor 2 on the rough surface 1a of the piece 1. In particular, if this piece is made of metal, a magnet may be used to that end, applied on the sensor 2 and magnetically attracted against the piece 1, maintaining the sensor 2 under pressure against the piece 1. A purely mechanical clamping device may also be used, enabling the pressure Pc exerted on the sensor 2 to be varied.

By way of example, FIG. 6 shows various curves obtained further to tests made with surfaces rendered rough by means of corundum cloths (curve A) and glass papers (curve B), under the effect of a constant pressure Pc equal to 2230 Pa. The deformation of compression $\epsilon$ is plotted on the y-axis, in micrometers, whilst the total roughness Rt, in micrometers, as determined with a roughness-meter with mechanical feeler, is plotted on the x-axis. This total roughness Rt characterizes the total deviation from the roughness as defined by standard NF E 05-015. This diagram shows that, in the case of glass paper (curve B), the variation of the superficial deformation $\epsilon$ is virtually proportional to the roughness, whilst, in the case of a corumdum cloth (curve A), the curve of variation is close to a straight line.

FIG. 7 illustrates a variant embodiment of the process according to the invention, in which, during the operation of measurement, there is simultaneously applied to the deformable element 3, still subjected to the predetermined constant pressure Pc in the direction of piece 1, a transverse force of traction Pd, i.e. parallel to surfaces 1a and 3a. The superficial deformation εb, in the plane of the surface 3b, which is generated further to the simultaneous application of the pressure Pc and the force Pd, may be measured and compared with the limiting elastic deformation of the surface 3b before the whole surface 3a is displaced transversely, in the plane of force Pd, with respect to the rough surface 1a of the piece 1 and until element 3 is totally displaced at the instant of the "start", i.e. at the moment when the intensity of the force Pd has attained a sufficient value to provoke lateral displacement of the whole of the volumic sensor 2. The superficial deformation εd of the surface 3b of the element 3 at the start characterizes with precision the force of friction for a given roughness of the surface 1a of the piece 1. The value of this superficial deformation εd at the start varies as a function of the total roughness Rt as indicated schematically by the diagram of FIG. 8 relative to a rough surface obtained by corundum cloths: this diagram shows that this superficial deformation εd at the start increases proportionally to the total roughness Rt.

The volumic roughness sensor 2 according to the invention may be used for the measurement of physical magnitudes influencing the roughness of the surface of any piece or of a disturbing action exerted on the deformable element 3 of the sensor.

FIG. 9 illustrates the use of the roughness sensor 2 for measuring a variable pressure Pi, exerted by a fluid or a solid element. This variable pressure Pi is applied to the interior of a chamber or a tube 12 applied against the surface 3b of the deformable element 3, and the extensometry gauge 4 which is placed on the surface 3b of the deformable element 3 is located inside the tube 12.

FIG. 10 illustrates the application of the volumetric sensor 2 for the non-destructive monitoring of an adhesive seal 13 interposed between the piece 1 on the rough surface 1a of which is applied the sensor 2, and another flat piece 14. The appearance of a microcrack 15 in the adhesive seal 13, including at the level of the cracks of plasticity, generates a superficial deformation of the rough surface 1a which is detected by the extensometry gauge 4. The sensitivity of the measurement is of the order of 1 $\mu m.m^1$. In this way, an extensive or, on the contrary, very small field of deformations may thus be observed.

The use of several extensometric gauges 4, on the surface 3b of the deformable element 3, makes it possible to find the preferential direction of the homogeneity and isotropy of the surface.

If the pieces 1, 14, assembled by the adhesive joint 13, have been subjected to an undulated fatigue test, for example at 30 Hz, the roughness of the surface 1a evolves in time and the variation of roughness and therefore the change of state or the evolution of the material may be measured, by means of the sensor 2, virtually punctually, i.e. in a small zone. The cycle of hysteresis of plasticity or of viscosity over some cycles may also be determined and the evolution of this cycle of hysteresis as a function of the number of cycles, and this for a small zone.

FIGS. 11, 12 and 13 show how the roughness sensor 2 according to the invention may be sensitive at the same time to the variations of roughness (FIG. 11), of undulation (FIG. 12), and of shape (FIG. 13). The extent of the sensor depends on the type of observation, i.e. it privileges the influence of the peaks of a definite scale. In FIG. 11, the sensor 2, of relatively reduced extent, is used for measuring the roughness of the surface 1a which ranges from 0.2 micrometer to 10 micrometers. In FIG. 12, the sensor 2 has a larger extent and it measures an undulation which extends over a distance of from 20 micrometers to 100 micrometers. In FIG. 13, the sensor is used for measuring a shape and there, there is no limit: in that case, several extensometric gauges 4 may be used, distributed one after the other on a deformable element 3 of large extent.

The roughness sensor 2 also makes it possible to monitor and to measure the evolution of the residual stresses in the piece 1, from the evolution of the roughness of its surface 1a. For example, in fatigue, the vibration of the stress peak generates a relaxation of the superficial layer which brings about a variation in the roughness of the surface 1a.

With the roughness sensor, the effect of one surface treatment with respect to another may also be monitored very rapidly. In fact, each surface treatment gives the surface a different roughness. For example, a sand blasting treatment gives the surface a roughness different from that obtained with a sulfochromic treatment. The roughness sensor may also be used for monitoring the difference in roughness of the surface 1a of the piece 1, respectively before and after a heat treatment.

Any physical magnitude inducing a variation in the roughness of the surface 1a may also be measured: for example, by means of the roughness sensor 2, the variation in temperature of the piece 1 and/or a pressure to which this piece is subjected may be measured, the variation in this temperature and/or pressure generating superficial deformations which are translated by variations in roughness. The roughness sensor 2 may continuously translate the variation of the temperature linked with the roughness and consequently it gives at the same time the possibility of adapting the roughness to a given temperature. This is particularly advantageous to define the optimum roughness, in the case of friction for example.

By means of the roughness sensor 2, a high temperature may also be remotely measured inside an enclosure, via the wall of this enclosure of which the roughness of the outer surface, on which the sensor is applied, varies as a function of the temperature.

FIG. 14 illustrates the application of the roughness sensor 2 to monitoring the defects of a glue joint 13 between the two pieces 1 and 14. The absence of glue (air bubble) at spot 13a in the glue joint 13 is translated by a modification of the roughness of zone B of the surface 1a opposite this air bubble 13a due to the different mechanical behaviour in this zone B of the material of the piece 1, and this in the state of rest. Before gluing, the roughnesses of zones A, B and C of the surface 1a are identical but, after gluing, the roughness of zone B which lies opposite the air bubble 13a, is different from the roughnesses of zones A and C, which are located on either side of zone B. The defect of the glue joint 13 may therefore be very easily detected.

FIG. 15 illustrates an application of the roughness sensor 2 as detector sensitive to suction. The sensor 2 is applied against the rough surface 15a of a porous body 15 in relation, tight with respect to the outside, with a humid medium 16 of variable humidity. The connection between the roughness sensor 2 and the porous body 15 is preferably effected in tight manner as shown in FIG. 15. The porous body 15 presents capillary channels of which the diameter varies between 0.1 micrometer and 2500 micrometers. The roughness sensor 2 measures, from the variation of the roughness of the surface 15a of the porous body 15 with which it is in contact, a force of suction of compression if the porous body 15 pumps humidity and, on the contrary, a force of suction of traction if this porous body dries.

The roughness sensor 2 may also be used as apparatus for monitoring a sensitive zone which degrades either by fatigue or by chemical agression or for any other reason. The sensor 2, placed on the rough surface 1a of the piece 1, may monitor any degradation of this piece 1, i.e. a modification of the internal tensions in this piece, under the effect of a pressure, temperature, ageing, a mechanical, physical or chemical stress exerted on the face opposite the one, 1a, on which the sensor 2 is applied, and translated by a variation in the roughness of the surface 1a. In this application, the sensor 2 makes it possible continuously to monitor the degradation of the piece 1 by recording the superficial deformations with respect to a reference value.

FIGS. 16 and 17 show that the roughness sensor 2 may be adapted to any shape of the surface of a piece, concave (FIG. 16), convex (FIG. 17), angular or other, and this thanks to the possibility of moulding the deformable element 3, made of rubber, with any shape corresponding to that of the piece on which it must be applied.

FIG. 18 illustrates the application of the roughness sensor 2 according to the invention to the monitoring of the evolution of the properties of a material as a function of the speed of stress. The piece 1 is shown as being subjected to a force f varying periodically in its plane, i.e. parallel to the plane of the rough surface 1a on which the sensor 2 is applied. This sensor makes it possible to monitor, in that case, the variation of the roughness, which is not possible with a conventional roughness-meter with mechanical feeler.

FIG. 19 shows a practical embodiment of an apparatus according to the invention. The roughness sensor 2 is housed in a recess 17 made in the front support face 18a of a support 18 which is applied under pressure against the rough surface 1a of the piece 1. Rigid crosspieces 19 are interposed between the upper surface 3b of the deformable element 3, which bears the extensometric gauge or gauges 4, and the bottom of the recess 17. The front face 18a of the support 18 is applied against the rough surface 1a via elastic deformable pads 21 which adhere, by means of pieces of double-face adhesive, on the one hand, to the front face 18a of the support 18 and, on the other hand, to the rough surface 1a. Furthermore, the support 18 bears on its outer surface adjustable screws 23 which extend parallel to the direction of application of the effort F generating the pressure Pc and which make it possible to adjust the rate of compression of the deformable element 3 of the sensor 2 and consequently the pressure Pc exerted by this element on the rough surface 1a.

According to a variant embodiment, the crosspieces 19 which are interposed between the upper surface 3b of the deformable element 3 and the bottom of the recess 17, may be constituted by a system of rolls or thrust ball bearings so as to ensure a degree of flat slide at the location of the interface between the element 3 and each crosspiece 19, on the one hand, and between the bottom of the recess 17 of the support 18 and each crosspiece 19, on the other hand.

According to another variant embodiment, a vacuum created inside the recess 17 in which the deformable element 3 is housed may be used for applying the support 18 under pressure against the rough surface 1a of the piece 1.

According to another variant, as shown in FIGS. 20 and 21, a fluid under pressure Pc, such as compressed air, may be introduced into the recess 17, which applies the deformable element 3 against the rough surface 1a under the pressure Pc. A tight peripheral bond is ensured between the front support face 18a of the support 18 and the rough surface 1a, by means of the adhesive pads 21. Furthermore, the deformable element 3 is maintained in contact with the rough surface 1a by means of supple connecting elements 24 which are distributed around the element 3 and which extend between the lateral surface of this element 3 and the rough surface 1a. These supple connecting elements 24 ensure that the deformable element 3 is held in place on the rough surface 1a when the volume of the recess 17 is not subjected to pressure Pc.

FIG. 22 illustrates a variant embodiment of the apparatus shown in FIG. 20 in which the deformable element 3, housed in the recess 17 of the support 18, may be maintained in contact with the rough surface 1a by means of a bearing plate 25 located between the surface 3b of the element 3 and the bottom of the recess 17. This bearing plate 25 is hollow in the central part of its face which is in contact with the surface 3b of the deformable element 3, in order to allow housing of the strain gauge 4. This front face is applied on the surface 3b with the interposition of a weak, non-permanent adhesive, for example. The bearing plate 25 is fixed to the lower end of the rod of a screw 26 which is screwed in a vertical tapped hole made in the support 18, with the interposition of a seal 27, and of which the head 28 is located above the support 18. The apparatus shown in FIG. 22 makes it possible to maintain the deformable element 23 in position by means of the bearing plate 25, when no pressure prevails inside the recess 17. For the measurement, the pressure Pc is applied inside the recess 17 and the bearing plate 25 is then disengaged upwardly, by rotating the screw 26 in the appropriate direction. Once the measurement is effected, the bearing plate 25 may be returned into position in order to maintain the deformable element 3 in contact with the rough surface 1a.

From the foregoing description, it is seen that one of the advantages offered by the volumic roughness sensor 2 according to the invention is that it is entirely recoverable after each measurement of roughness, since the deformable element 3 instantaneously resumes its initial state of rest due to its elasticity.

Although, in the foregoing description, the measuring apparatus comprises only one extensometry gauge 4, it goes without saying that it may also comprise several, extending, for example, in two perpendicular directions or even radially in six directions at 60° with respect to one another, etc . . .

What is claimed is:

1. A process for measuring the roughness of a surface of a piece in which there is applied on the rough surface of the piece a first surface of a deformable flat element and there is exerted on a second surface of the deformable flat element, parallel and opposite the first surface, a constant pressure in the direction of the piece, so that the first surface of the deformable element closely follows the profile of the rough surface, penetrating between the peaks of this rough surface,
  wherein the deformable flat element is made of an elastomeric material having a high degree of reversible elastic deformability so that the first surface of the element penetrates elastically and reversibly between the peaks of the rough surface, and the deformation (Poisson's contraction or dilatation) or the resultant displacement of the second surface of the deformable element is measured in situ, i.e., while the deformable flat element is being pressed against the rough surface.

2. The process of claim 1, wherein an effort of variable intensity may further be exerted on the deformable element, during measurement, parallel to the plane of the rough surface.

3. An apparatus for measuring the roughness of a surface of a piece comprising a deformable element of constant thickness, having two principal surfaces, namely a first surface adapted to be applied on the surface whose roughness is to be measured, and a second surface and means for applying the deformable element under a predetermined pressure on the rough surface, wherein the deformable element is made of an elastomeric material having a high degree of reversible elastic deformability and it bears on its second surface, i.e. the one which is opposite the first surface applied on the rough surface, at least one deformation gauge connected to a measuring apparatus.

4. The apparatus of claim 3, wherein each gauge is glued on the second surface of the deformable element.

5. The apparatus of claim 3, wherein the gauge is fixed to the second surface of the deformable element by means of a double-face self-sticking adhesive.

6. The apparatus of claim 3, wherein a self-sticking adhesive is applied on the first surface in order to ensure bond of the deformable element with the piece.

7. The apparatus of claim 3, wherein, above the gauge there extends a layer of protective resin and above this layer is disposed a piece of adhesive tape.

8. apparatus of claim 3, comprising a support applied, by its front face, against the surface whose roughness is to be measured, the deformable element is housed in a recess made in the front face of the support, the front face of the support is applied against the rough surface via elastic deformable pads which adhere, by means of pieces of double-face adhesive, on the one hand, to the front face of the support and, on the other hand, to the rough surface, and means are provided for applying the deformable element housed in the recess against the rough surface, under pressure.

9. The apparatus of claim 8, wherein crosspieces, constituted by fixed or mobile, rigid elements, are interposed between the second surface of the deformable element which bears the extensometric gauge or gauges, and the bottom of the recess, and the support bears, on its outer surface, adjustable screws which extend parallel to the direction of application, on the support, of an effort generating the pressure and which make it possible to adjust the rate of compression of the deformable element and consequently the pressure exerted by this element on the rough surface.

10. The apparatus of claim 8, wherein means are provided for creating a vacuum or for introducing a fluid under pressure in the recess in order to exert the pressure on the deformable element applied against the rough surface.

11. The apparatus of claim 10, wherein supple holding elements are distributed about the deformable element and extend between the rough surface and the lateral surface of the deformable element, in order to maintain the latter in position when no pressure is present in the recess.

12. The apparatus of claim 10, comprising inside the recess, between the deformable element and the bottom of the recess, a support plate hollowed, in its central part, with a housing adapted to receive the extensometry gauge, and which is fast with the end of a screw screwed in a tapped hole in the support so as to be able to maintain the deformable element against the rough surface, when no pressure prevails in the recess by means of the support plate pressed against the second surface of the deformable element.

13. An apparatus for measuring the roughness of a piece having a rough surface, comprising:
  a deformable element of constant thickness including a first principal surface adapted to be applied onto the rough surface whose roughness is to be measured and a second principal surface opposite to said first principal surface;
  means for applying said deformable element under a predetermined pressure onto the rough surface, said deformable element being made of a material having a high degree of reversible elastic deformability;
  a self-sticking adhesive applied on said first principal surface for ensuring bonding of said deformable element with the piece; and
  at least one deformation gauge connected to a measuring apparatus on said second principal surface.

14. The apparatus of claim 13, wherein said deformation gauge is an extensometry gauge glued onto said second principal surface.

15. The apparatus of claim 14, including means fixing said extensometry gauge to said second principal surface.

16. The apparatus of claim 13, wherein, above said deformation gauge, there extends a layer of protective resin and, above said layer of protective resin is disposed a piece of adhesive tape.

17. The apparatus of claim 13, comprising:
  a support including a front face to be applied against the surface whose roughness is to be measured, said support having a recess in said front face;
  said deformable element being housed in said recess and including deformable pads adhered to said front face by pieces of double-faced adhesive for application against the rough surface, one side of said double-faced adhesive adhering said deformable pads to the front face of said support and the other side of said double-faced adhesive adhering said pads to the rough surface; and
  means for applying said deformable element under pressure against the rough surface.

18. The apparatus of claim 17, including means for creating a vacuum or for introducing a fluid under pressure in said recess for exerting pressure onto said deformable element.

19. The apparatus of claim 17, including supple holding elements distributed about said deformable element and extending between the rough surface and the lateral surface of said deformable element for maintaining the latter in position when no pressure is present in said recess.

20. The apparatus of claim 18, including:

a support plate inside said recess between said deformable element and the bottom of said recess, said support plate being hollowed, in its central part, for receiving and housing said gauge; and a screw screwed in a tapped hold in said support plate, said support plate being fast with an end of said screw for maintaining said deformable element against the rough surface, when no pressure prevails in said recess by means of said support plate pressed against the second surface of said deformable element.

* * * * *